(12) United States Patent
Koehn et al.

(10) Patent No.: US 7,624,005 B2
(45) Date of Patent: Nov. 24, 2009

(54) STATISTICAL MACHINE TRANSLATION

(75) Inventors: Philipp Koehn, Venice, CA (US); Kevin Knight, Hermosa Beach, CA (US)

(73) Assignee: University of Southern California, Los Angeles, CA (US)

( * ) Notice: Subject to any disclaimer, the term of this patent is extended or adjusted under 35 U.S.C. 154(b) by 939 days.

(21) Appl. No.: 10/403,862

(22) Filed: Mar. 28, 2003

(65) Prior Publication Data

US 2004/0024581 A1    Feb. 5, 2004

Related U.S. Application Data

(60) Provisional application No. 60/368,851, filed on Mar. 28, 2002.

(51) Int. Cl.
*G06F 17/20* (2006.01)
*G06F 17/28* (2006.01)
*G06F 17/27* (2006.01)

(52) U.S. Cl. .................. 704/2; 704/1; 704/3; 704/4; 704/5; 704/9

(58) Field of Classification Search .............. 704/4
See application file for complete search history.

(56) References Cited

U.S. PATENT DOCUMENTS 4,502,128 A * 2/1985 Okajima et al. .............. 704/8
4,661,924 A * 4/1987 Okamoto et al. ............. 704/8

FOREIGN PATENT DOCUMENTS

| JP | 07244666 | 9/1995 |
|---|---|---|
| JP | 10011447 | 1/1998 |
| JP | 11272672 | 10/1999 |

OTHER PUBLICATIONS

Kenji Imamura "Hierarchical Phrase Alignment Harmonized with Parsing", in Proceedings of NLPRS 2001, Tokyo.*
Ferran Pla, Antonio Molina and Natividad Prieto "Tagging and Chunking with bigrams", ACL Coling 2000, vol. 2, 18th International Conference on Computational Linguistics, pp. 614-620.*
Michael Car, "A Constructionst Approach to Machine Translation", New Methods of Language Processing and Computational Natural Language Learning, 1998, pp. 247-256.*
Yamamoto et al, "Acquisition of Phrase-level Bilingual Correspondence using Dependency Structure" In Proceedings of COLING-2000, pp. 933-939.*
David Yarowsky, "Unsupervised Word Sense Disambiguation Rivaling Supervised Methods", Department of Computer and Information Science, 1994, Proceedings of ACL 32, pp. 189-196.

(Continued)

*Primary Examiner*—Richemond Dorvil
*Assistant Examiner*—Matthew Baker
(74) *Attorney, Agent, or Firm*—Carr & Ferrell LLP (57) ABSTRACT

A method includes detecting a syntactic chunk in a source string in a first language, assigning a syntactic label to the detected syntactic chunk in the source string, mapping the detected syntactic chunk in the source string to a syntactic chunk in a target string in a second language, said mapping based on the assigned syntactic label, and translating the source string into a possible translation in the second language.

18 Claims, 4 Drawing Sheets

OTHER PUBLICATIONS

Hinrich Schutze, "Automatic Word Sense Discrimination", 1998, Association for Computational Linguistics, vol. 24, No. 1, pp. 97-123.
Ido Dagan and Alon Itai, "Word Sense Disambiguation Using A Second Language Monolingual Corpus", 1994, Association for Computational Linguistics, vol. 20, No. 4, pp. 563-596.
Brown, et al., "Word-Sense Disambiguation Using Statistical Methods", 1991, Proceedings of ACL 29, pp. 264-270.
Brown, et al., The Mathematics of Statistical Machine Translation: Parameter Estimation, 1993, Association for Computational Linguistics, vol. 19, No. 2, pp. 263-311.
Resnik, et al., "A Perspective on Word Sense Disambiguation Methods and Their Evaluation", 1997, ACL 35, Siglex Workshop at ANLP.
Raymond J. Mooney, "Comparative Experiments on Disambiguating Word Senses: An illustration of the Role of Bias in Machine Learning" 1996, Proceedings of the Conference on Empirical Methods in Natural Language Processing.
Knight, et al. "Filing Knowledge Gaps in a Broad-Coverage Machine Translation System", 1995, International Joint Conference on Artificial Intelligence.
Dempster, et al., "Maximum Likelihood From Incomplete Data Via The EM Algorithm", 1977, Journal of The Royal Statistical Society, vol. 39, No. 1, pp. 1-38.
Leonard E. Baum, "An Inequality and Associated Maximization Technique in Statistical Estimation for Probabilistics Functions of Markov Processes", 1972, Inequalities Journal, vol. 3, pp. 1-8.
Philipp Koehn and Kevin Knight, "Knowledge Sources for Word-Level Translation Models", 2001, Proceeding of EMNLP.
Philipp Koehn and Kevin Knight, Estimating Word Translation Probabilities From Unrelated Monolingual Corpora Using the EM Algorithm, 2000, Proceedings of American Association for , Artificial Intelligence.
Reinhard Rapp, "Identifying Word Translations in Non-Parallel Texts", 1995, Proceedings of ACL 33, pp. 320-322.
Reinhard Rapp, "Automatic Identification of Word Translations from Unrelated English and German Corpora", 1999, Proceedings of ACL 37, pp. 519-526.
Mona Diab and Steve Finch, "A Statistical Word-Level Translation Model for Comparable Corpora", 2000, Proceedings of the Conference on Content-Based Multimedia Information Access (RIAO).
Pascale Fung and Lo Yuen Yee, "An IR Approach for Translating New Words from Nonparallel, Comparable Texts", 1988, Proceedings of ACL 36, pp. 414-420.
Pascale Fung, "Compiling Bilingual Lexicon Entries From a Non-Parallel English-Chinese Corpus", 1995, Third Workshop on Very Large Corpora, pp. 173-183.
Irene Langkilde and Kevin Knight, "Generation That Exploits Corpus-Based Statistical Knowledge" 1998, Proceedings of ACL 36, pp. 704-710.
Mona Diab, "An Unsupervised Method for Multilingual Word Sense Tagging Using Parallel Corpora: A Preliminary Investigation", 2000, Siglex Workshop on Word Senses and MultiLinguality, pp. 1-9.
Philip Resnik, "Mining the Web for Bilingual Text", 1999, Proceedings of ACL 37, pp. 527-534.
William A. Gale and Kenneth W. Church, "A Program For Aligning Sentences In Bilingual Corpora", 1993, Computational Lingustics, vol. 19, No. 1, pp. 177-184.
Jorg Tiedemann, "Automatic Construction of Weighted String Similarity Measures", 1999, Proceedings of the Conference on Empirical Methods in Natural Language Processing, EMNLP, pp. 213-219.
K. Dan Melamed, "Automatic Evaluation and Uniform Filter Cascades for Inducing $N$-Best Translation Lexicons", 1995, Third Workshop on Very Large Corpora, pp. 184-198.
K. Sparck Jones, "Experiments in Relevance Weighting of Search Terms", Program Press Limited 1979, Information Processing & Management, vol. 15, pp. 133-144.
Al-Onaizan, et al., "Statistical Machine Translation" 1999, JHU Summer Workshop, pp. 1-42.
Daniel Marcu, "Towards a Unified Approach to Memory-and Statistical-Based Machine Translation", 2001, Proceedings of ACL 39.

Steven P. Abney, "Parsing by Chunks", 1991, Robert Berwick, Steven Abney, and Carol Tenny: Principle-Based Parsing.
Erik F. Tjong Kim Sang and Sabine Buchholz, "Introduction to the CoNLL-2000 Shared Task: Chunking", 2000, Proceedings of CoNLL 2000 and LLL-2000, pp. 127-132.
Ye-Yi Want, "Grammar Inference and Statistical Machine", 1998, School of Computer Science, pp. 1-137.
Franz Josef Och and Hermann Ney, "Improved Statistical Alignment Models", 2000, Proceedings of ACL 38.
Philip Clarkson and Ronald Rosenfeld, "Statistical Language Modeling Using the CMU-Cambridge Toolkit", 1997, Proceedings of Eurospeech.
Thorsten Brants, "TnT-A Statistical Part-of-Speech Tagger", 2000, Proceedings of the Sixth Applied Natural Language Processing Conference ANLP-2000.
Germann et al., "Fast Decoding and Optimal Decoding for Machine Translation", 2001, Proceedings of ACL 39.
Kenji Yamada and Kevin Knight, "A Syntax-based Statistical Translation Model", 2001, Proceedings of ACL 39.
Kiyan Alshawi et al., "Learning Dependency Translation Models as Collections of Finite-State Head Transducers", 2000, Association for Computational Linguistics, vol. 26, No. 1, pp. 45-60.
Dekai Wu, "Stochastic Inversion Transuction Grammars and Bilingual Parsing of Parallel Corpora", 1997, Association for Computational Linguistics, vol. 23, No. 3, pp. 377-403.
Sonja NieBen and Hermann Ney, "Toward Hierarchical Models for Statistical Machine Translation of Inflected Languages", 2001, Workshop on Data-Driven Machine Translation at ACL 39, pp. 47-54.
Helmut Schmid and Sabine Schulte im Walde, "Robust German Noun Chunking With a Probabilistic Context-Free Grammar", 2000, Proceedings of Coling, pp. 726-732.
Kishore Papineni, et al., "Bleu: a Method for Automatic Evaluation of Machine Translation", Sep. 17, 2001 IBM Research Report, pp. 1-9.
Eric Brill, "Transformation-Based Error-Driven Learning and Natural Language Processing: A Case Study in Part-of-Speech Tagging", Dec. 1995, vol. 21, No. 4, Computational Linguistics, pp. 543-565.
Brown, et la., "A Statistical Approach to Machine Translation", Jun. 1990, Computational Linguistics, vol. 16, No. 2, pp. 79-85.
Steven P. Abney, "Parsing by Chunks", 1991, Principle-Based Parsing: Computation and Psycholinguistics, vol. 44, pp. 257-279.
Alshawi., et al. Learning Dependency Translation Models as Collections of Finite-State Head Transducers, Computational Linguistics, vol. 26, No. 1, pp. 45-60.
Taro Watanabe, Kenji Imammura and Eiichiro Sumita, "Statistical Machine Translation Based on Hierarchical Phrase Alignment", Proceedings of the $9^{th}$ International Conference on Theoretical and Methodological Issues in Machine Translation, Mar. 13-17, 2002.
K. Chen and H. Chen, "Machine Translation: An Integrated Approach", Proceedings of the Sixth International Conference on Theoretical and Methodological Issues in Machine Translation, Jul. 5-7, 1995, pp. 287-294.
P. Koehn and K. Knight, "ChunkMT: Statiscal Machine Translation with Richer Linguistic Knowledge", Information Sciences Institute, Apr. 20, 2002.
S. Vogel, "The Statistical Translation Module in the Verbmobil System", Workshop on Multi-Lingual Speech Communication, Oct. 11-13, 2000, pp. 69-74.
Och, F.J. et al, "Improved Statistical Alignment Models," Proc. of the 38th Annual Meeting of the Association for Computational Linguistics, Oct. 2-6, 2000, pp. 440-447.
Yamamoto, A Comparative Study on Translation Units for Bilingual Lexicon Extraction, Japan Academic Association for Copyright Clearance, Tokyo, Japan, Sep. 10, 2001.
Manning, Christopher D., et al., "Foundations of Statistical Natural Language Processing", The MIT Press: Cambridge Massachusetts, 1999, Brief Contents.
"Special Issue on Word Sense Disambiguation", Computational Linguistics, vol. 24, No. 1, Mar. 1998, MIT Press for the Association for Computational Linguistics.

* cited by examiner

| der | → DT | the |
| Agrarausschuss | → NNP | subcommittee |
| NULL | → IN | for |
| Agrarausschuss | → NNP | agriculture |
| lehnt,ab | → VBZ | rejects |
| den | → DT | the |
| vorschlag | → NNP | proposal |

STATISTICAL MACHINE TRANSLATION

CROSS-REFERENCE TO RELATED APPLICATIONS

This application claims priority to U.S. Provisional Application Ser. No. 60/368,851, filed on Mar. 28, 2002, which is hereby incorporated by reference.

ORIGIN OF INVENTION

The research and development described in this application were supported by DARPA-ITO under grant number N66001-00-1-8914. The U.S. Government may have certain rights in the claimed inventions.

BACKGROUND

Machine translation (MT) is the automatic translation, for example, using a computer system, from a first language (a "source" language) into another language (a "target" language). Systems that perform an MT process are said to "decode" the source language into the target language. From an end-user's perspective, the MT process is relatively straight-forward. The MT process receives as input a source sentence (or "string" of words) and after processing the input sentence, outputs a translated sentence in the target language.

One type of MT process is referred to as a statistical MT decoder. Conventional statistical MT decoders may include a language model (LM) and a translation model (TM).

SUMMARY

According to an aspect of this invention, a method includes detecting a syntactic chunk in a first string in a first language, assigning a syntactic label to the detected syntactic chunk in the first string, aligning the detected syntactic chunk in the first string to a syntactic chunk in a second language string, said aligning based on the assigned syntactic label, and translating each word from the first string into a second word corresponding to a possible translation in the second language.

One or more of the following features may also be included. Grouping at least two words from the first string based on part of speech identifiers tagged to the at least two words. Defining connections between the detected syntactic chunk in the source string to a chunk in the second string. Determining connections based on a chunk mapping table, the chunk mapping table using pre-defined connections based on syntactic chunk labels. Defining a connection between the detected chunk from the first string to at least two non-adjacent chunks in the target string. Defining a connection of at least two detected chunks from the source string to a single chunk in the target string.

DETAILED DESCRIPTION

A statistical MT system as described herein may be modeled as three separate parts: (1) a language model (LM) that assigns a probability P(e) to any target string of words, (2) a translation model (TM) that assigns a probability P(f|e) to any pair of target and source strings, and (3) a decoder that determines translations based on the assigned probabilities of the LM and TM.

A conventional MT system may translate source sentences into target sentences by making a series of word-based decisions. The word-based decisions may include a translation decision where each source word is translated to a target word. A mapping ("alignment") decision may also be performed for each translated word, e.g., mapping multiple source words to a single target word-based on a determined fertility of the translated source word. A rearrangement ("distortion") decision may also be performed, e.g., re-arranging the order of words from a source sentence to translated words in the corresponding target sentence. The translation, mapping and distortion decisions are based on weighted probabilities determined during the translation process.

Some source sentences pose translational challenges that are not handled well by conventional word-based MT systems. For example, translational challenges include the translation of phrases, restructuring sentences for syntactical reasons, and translations of non-adjacent words into single words or phrases in the target sentence.

Figure 1:
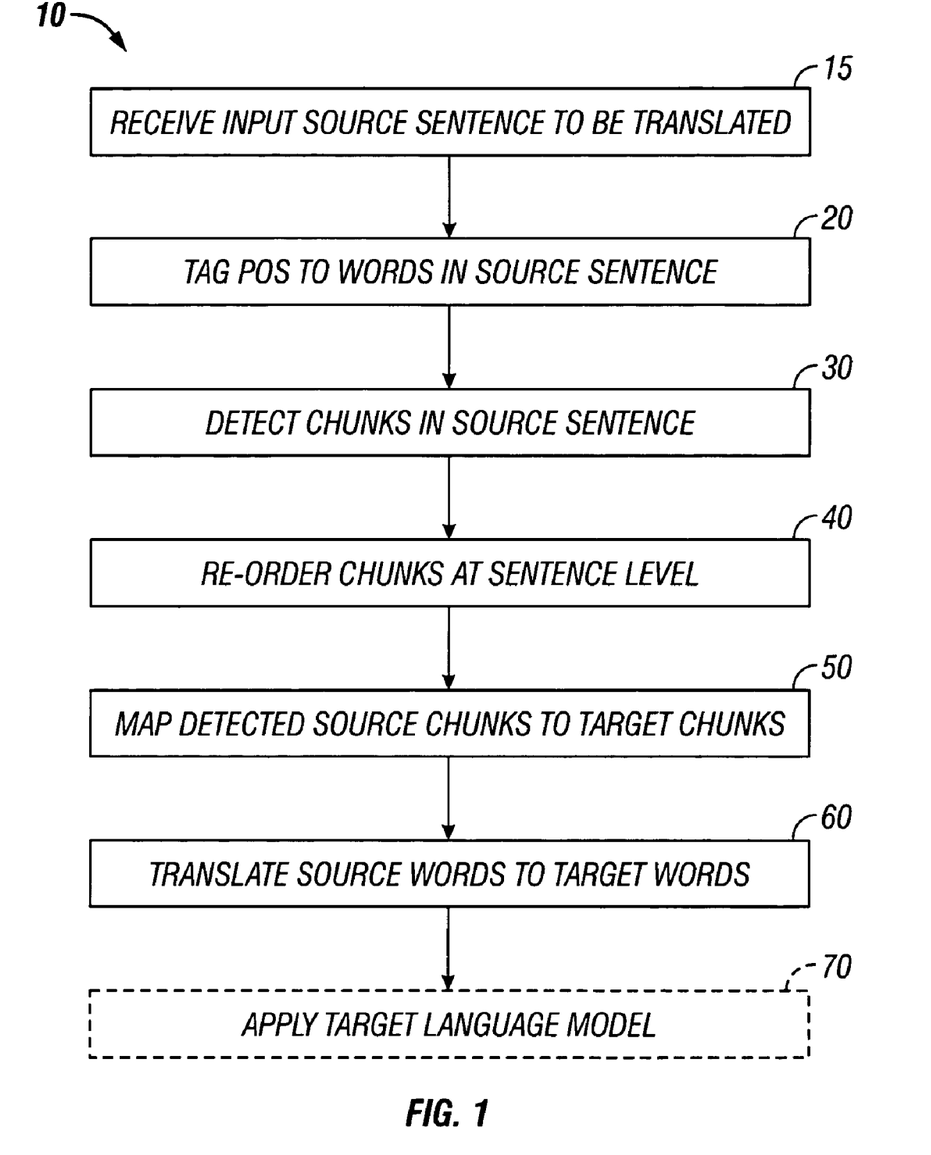
FIG. 1 is a flowchart of a linguistic statistical translation (LST) process.

FIG. 1 depicts a linguistic statistical translation model (LST) process 10 that includes receiving (15) a source sentence to be translated, assigning (20) a "part of speech" (POS) tag(s) for each source word in a source sentence, and detecting (30) syntactic "chunks" included in the source sentence. LST process 10 also includes actions (40), (50) and (60) that are based, in part, on the assigned POS tag(s) and/or the detected syntactic chunk(s). The use of POS tag(s) and/or syntactic chunk(s) in process 10 allows for improved translations of source to target sentences, and, in particular improved string translations of the translational challenges identified previously.

A POS tag refers to an identifying symbol that represents a type of word, e.g., a "VVFIN" symbol may be tagged to a finite verb. An exemplary set of POS tags that may be used in process 10 is referred to as the "Penn Treebank Tag set", and described in Mitchell P. Marcus, Beatrice Santorini, and Mary Ann Marcinkiewicz: "*Building a Large Annotated Corpus of English: The Penn Treebank*", in *Computational Linguistics*, Volume 19, Number 2 (June 1993), pp. 313-330 (Special Issue on Using Large Corpora), which is hereby incorporated by reference.

Chunking refers to the grouping of non-recursive verb, noun, prepositional, or other phrases in a sentence. Chunking may include detecting groupings in a source sentence and the output of chunks combinations in a target sentence. The concept of chunking is discussed in Abney, S. (1991) "*Parsing by chunks*", In Robert Berwick, Steven Abney, and Carol Tenny: *Principle-Based Parsing*. Kluwer Academic Publishers.

Still referring to FIG. 1, LST process 10 includes receiving (15) an input source sentence to be translated, tagging (20) each word in the source sentence with a POS tag, detecting (30) syntactic chunks (e.g., phrases) in each source sentence, sentence-level chunk reordering (40), mapping (50) detected source chunks to target chunks in the target sentence, and translating (60) each word from the source to target sentence. The word translations produced by action (60) may be further refined by use of an optional target language model (70).

Figure 2:
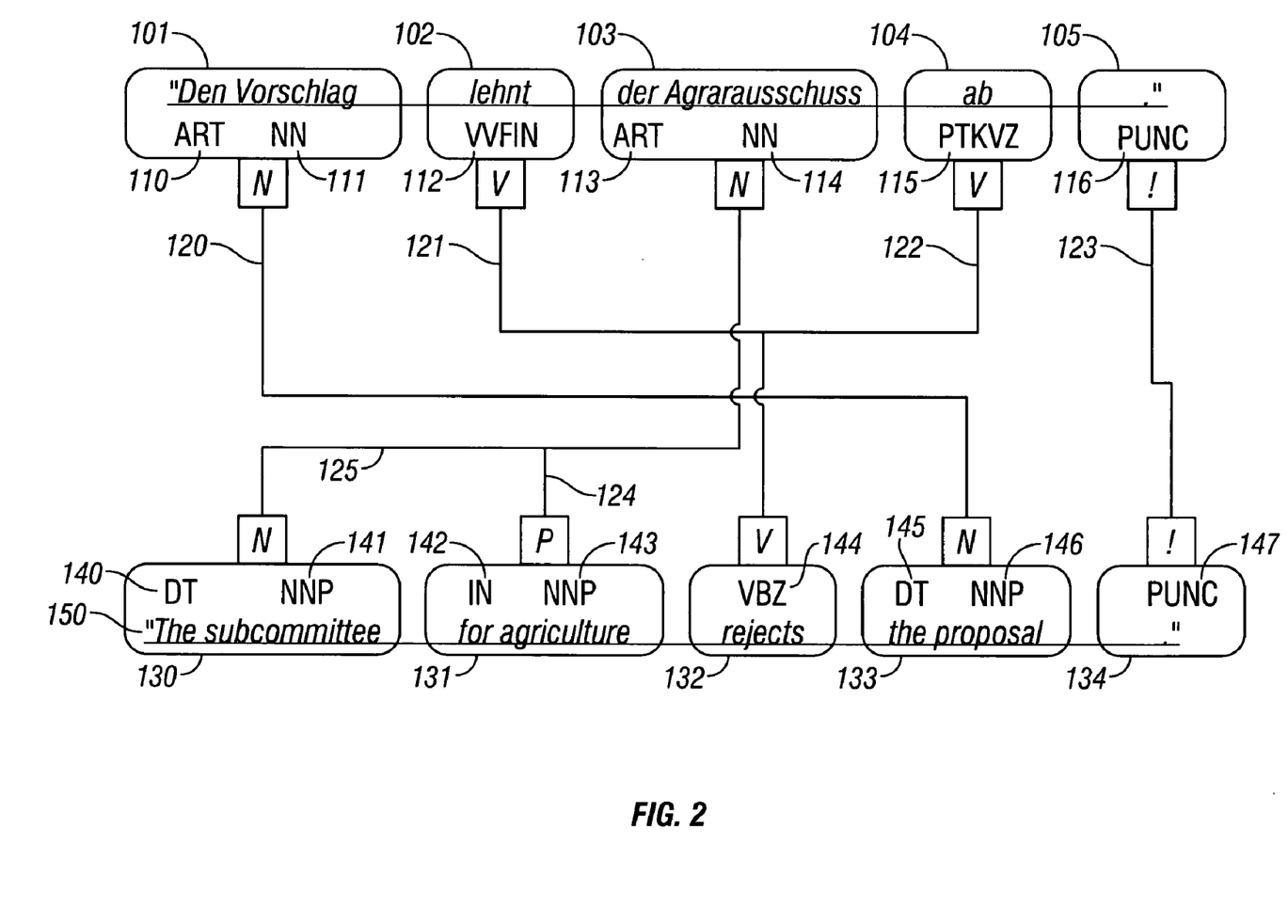
FIG. 2 illustrates an exemplary source and target sentence.

FIG. 2 shows an exemplary source sentence 100 with each word having an associated POS tag 110-116 generated during action (20), and detected syntactic chunks 101-105 generated during action (30). Detected chunks 101-105 also include syntactic labels, e.g., "N, V, N, V and !", respectively. Syntactic labels refer to the syntactic portion of a sentence for the detected chunk, for example, "N" may refer to a base noun phrase, "V" may refer to a verb complex, "P" may refer to a base prepositional phrase, "A" may refer to an adjective, "F" may refer to a function word, and "!" may refer to punctuation.

Figures 3, 4:
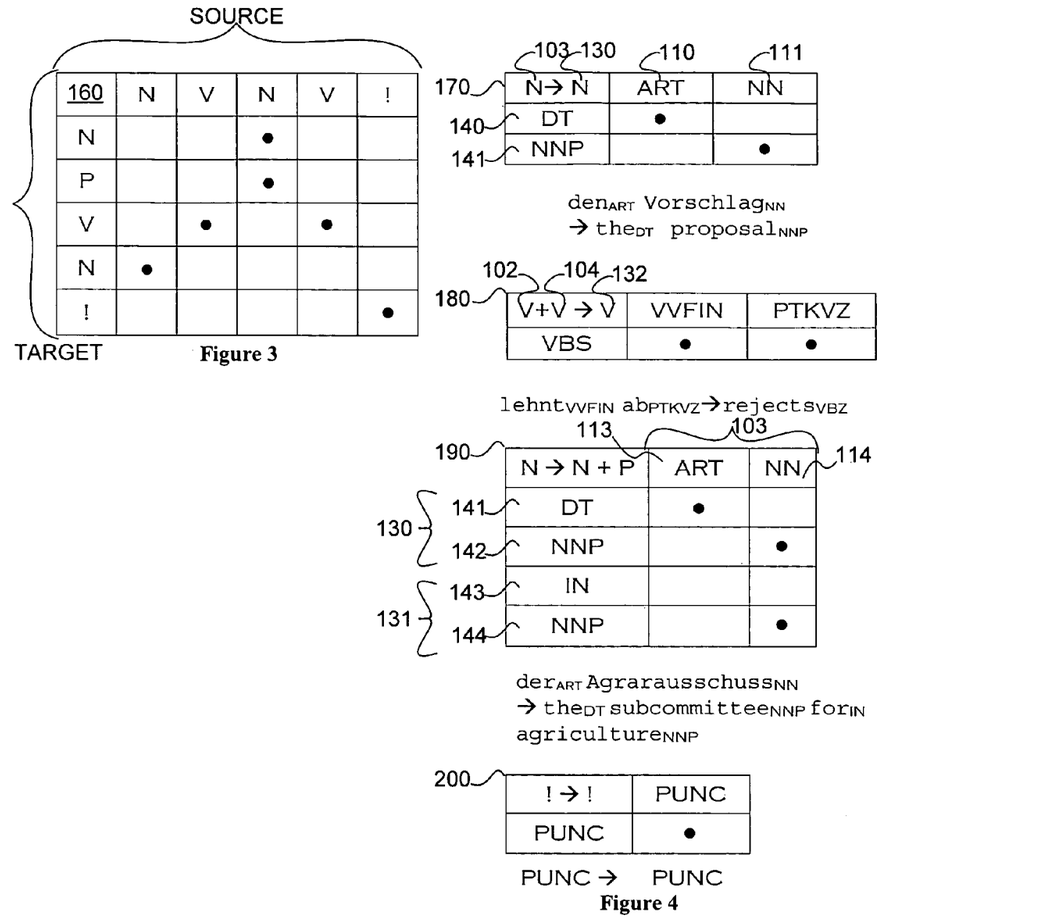
FIG. 3 illustrates a sentence-level chunk reordering table corresponding to the sentences of FIG. 2.
FIG. 4 illustrates chunk mapping alignment tables corresponding to FIGS. 2-3.

Sentence-level chunk re-ordering (40) defines connections 120-125 between each source chunk 101-106 and a corresponding target chunk 130-134 that will be included in the target sentence 150. In many cases, the target chunks are re-ordered relative to the source chunks. This reordering may be based upon templates that define likely connections between detected syntactic chunks to corresponding syntactic chunks in a target sentence. Connection(s) may be single-valued or multi-valued (e.g., one-to-one, many-to-many, or one-to-many, etc.). FIG. 3 shows a chunk connection table 160 that is representative of the connections 120-125 between source chunks 101-105 and target chunks 130-134, corresponding to those shown in FIG. 2.

FIG. 4 shows chunk mapping tables 170, 180, 190 and 200 that are representative of the chunk mappings created by action (50) of process 10 as applied to exemplary sentence 100. Chunk mapping refers to the alignment of each source chunk to a target chunk and may be referenced in terms of the POS tag of words in the source chunk and words in the target chunk. For example, as shown in table 170, source POS tags 110 ("ART") and 111 ("NN") are aligned to target POS tags 140 ("DT") and 141 ("NNP"). Chunk mappings may align multiple chunks ("complex chunks") to single chunks or other complex chunks. For example, as shown in table 190, source chunk 103 is aligned to a complex chunk including target chunk 130 and 131. Non-adjacent chunks from the source sentence 110 may be combined into a single chunk, for example, as shown in table 180, combining chunks 102 and 104 into target chunk 132.

As described previously, each complex chunk may be "labeled" with an assigned syntactic chunk label. This labeling may allow improved reordering of chunks at the sentence level, since the syntactic label may identify their syntactic role in a sentence.

Figure 5:
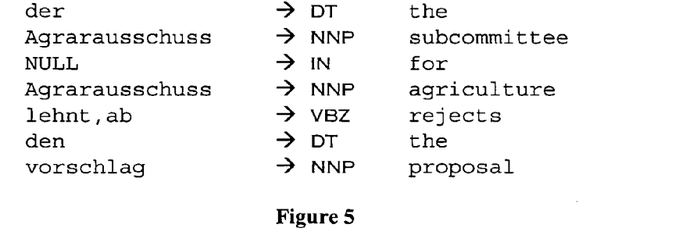
FIG. 5 illustrates word translations corresponding to FIGS. 1-4.

Process 10 then translates (60) the source words from the source language sentence to words for the target language sentence. Word translation may be determined, in part, on the part-of-speech assigned to the corresponding source word (selected by the chunk mapping), e.g., restricting a selection of a word corresponding to the assigned POS tag. FIG. 5 depicts the performance of action (60) from process 10, e.g., depicting word translations corresponding to the example shown in FIGS. 1-4.

In an embodiment, instead of generating target language words by individual word translations, a complex chunk may be translated by exact phrase lookup. In more detail, if an entire source chunk is determined to be a known phrase, the entire source chunk may be translated as the known phrase. For example, as shown in FIG. 2, if the words included in source chunk 103 "der Agrarausschuss" is a known phrase, it may be translated directly into the words in target chunks 130-131 "the sub-committee for agriculture". Exact phrase lookup allows for the translation of idiomatic phrases that are not easily translated using word-based translations.

Process 10 may include an optional target language model (70) that is performed to provide additional fluency improvements to the target sentence.

Mathematical Formulation of Process 10

The operations of LST process 10 may be modeled mathematically, for example, modeled on a set of probability determinations. The mathematical model of process 10 that follows includes a formulation that follows the noisy channel model. In more detail, this means that instead of estimating $p(e|f)$ directly (e.g., the best translation e for an input string f), Bayes rule is applied to maximize $p(f|e) \times p(e)$. Therefore, this splits the model into two parts: a translation part $p(f|e)$ and a language model $p(e)$. For the language part, a trigram language model may be used.

The translation part is decomposed into sentence level reordering (SLR), chunk mapping (CM) and word translations (W), and may be modeled with the following probability equation:

$$p(f|e) = p(SLR|e) \times \Pi_i p(CM_i|e, SLR) \times \Pi_j p(W_{ij}|CM_i, SLR, e)$$

Since POS tagging and chunking is deterministic, e represents not only words of the target string, but also their POS and groupings into chunks. The sentence level chunk reordering (SLR) and word reordering within chunks (CM) may be performed using templates, for example, using templates representative of the information from the tables shown in FIGS. 3 and 4. Word translation (W) may be accomplished using a word-by-word translation table.

Direct application of the three probability equations above may be problematic due to sparse data. Therefore the three conditional probability distributions may be simplified, as follows:

p(SLR) may be conditioned only on each target chunk label sequence;

$p(CM_i)$ may be conditioned only on the relevant source and target chunk labels, and the target POS tags;

$p(W_{ij})$ may be conditioned only on the relevant target POS tag and word.

Each word alignment in a chunk mapping is factored in with a word translation probability. Unaligned source words are factored in with the probability $p(f_x|ZFERT, f_{posk})$. Unaligned target words are factored in with the probability $p(NULL|e_k, f_{posk})$ Instead of decomposing the chunk mapping into word translations, a direct phrase lookup may be performed, which is modeled by the following equation:

$$p(W_{i1}, \ldots, W_{in}|CM_i, SLR, e)$$

Parameters for the word alignments may be determined using a so-called parallel corpus method in which text in a source language string (a first corpus) is aligned to translated text in a target language string (the second corpus). These alignments establish correspondences between source words in the source string and the target string. Both sides of the parallel corpus may also be POS tagged and chunked.

Chunk mappings may be determined using a parallel corpus method, for example, if a source chunk and a target chunk contain a source word and a target word that are aligned to each other, the two chunks are connected. Chunks that contain no aligned words may be attached to other chunks based on a set of rules, for example, adverbs are attached to a following verb chunk if they are unaligned, or commas are attached to a following function word if they are unaligned, and so forth.

A transitive closure may then be performed on any chunk alignments, for example, using the following rule set: If chunk $f_i$ is aligned with $e_x$, $f_j$ is aligned with $e_x$, and chunk $f_i$ is aligned with $e_y$, then chunk $f_j$ is considered aligned with $e_y$, even if they do not contain any words aligned to each other. The transitive closure ensures a one-to-one mapping between complex chunks in a source sentence and a target sentence.

Aligning a parallel corpus based on the above formulations allows statistics to be collected on word translations (including $P(f_k|ZFERT, f_{posk})$ and $p(NULL|e_k, f_{posk})$), complex chunk mappings, and sentence level reordering. Conditional probability distributions may then be collected by maximum likelihood estimation. Since the data for exact phrase lookup is highly noisy, the probabilities may be smoothed.

In an embodiment, the translation part of the model (e.g., "decoding") may be performed in two steps: First a sentence level template (SLT) for each sentence level chunk reordering is generated. Second, a target translation is constructed a word at a time from left to right. This is repeated for the top n SLT for each given source chunk sequence. Ultimately, the translation with the overall best score is selected as a system output.

The construction of a target sentence for a given sentence level template (SLT) may be implemented by a Viterbi search using dynamic programming. In this case, chunk mapping templates are selected as needed. Then word slots are filled with use of a word-by-word translation table and a language model. At the end of each complex chunk, information about which chunk mapping template was used may be discarded. In some implementations the construction of the target string may include the insertion of a NULL word.

However, for each partial translation (or hypothesis), the following information is maintained:
 last two words created (needed by the language model);
 current chunk mapping template, if not complete;
 current score ('score' refers to the product of the combined probabilities of partial translation decision, chunk mapping decisions, etc.)
 back pointer to best path;
 position of last chunk;
 position of last word created within chunk;
 "stacked chunk mapping templates"

Stacked chunk mapping templates refers to information needed when a disconnected complex chunk is filled in the target translation: for example, if the SLT calls for the creation of a "V+P" chunk, with additional material between "V" and "P". In this case, the information about the chunk mapping template that was selected has to be carried through between the "V" and "P", until it is completely filled.

The complexity of the hypothesis space at any given position in a target sentence may be represented as $O(V^2C^{1+s})$, with V being the vocabulary size, C the number of applicable chunk mapping templates, and s the number of stacked chunk mapping templates.

The model may be simplified by restricting translations to contiguous complex chunks in the target language, which eliminates the need for stacked chunk mapping templates. This simplifies the complexity equation to $O(V^2C)$ at any given position. This also assures that, in respect to sentence length, decoding has linear complexity.

Figure 6:
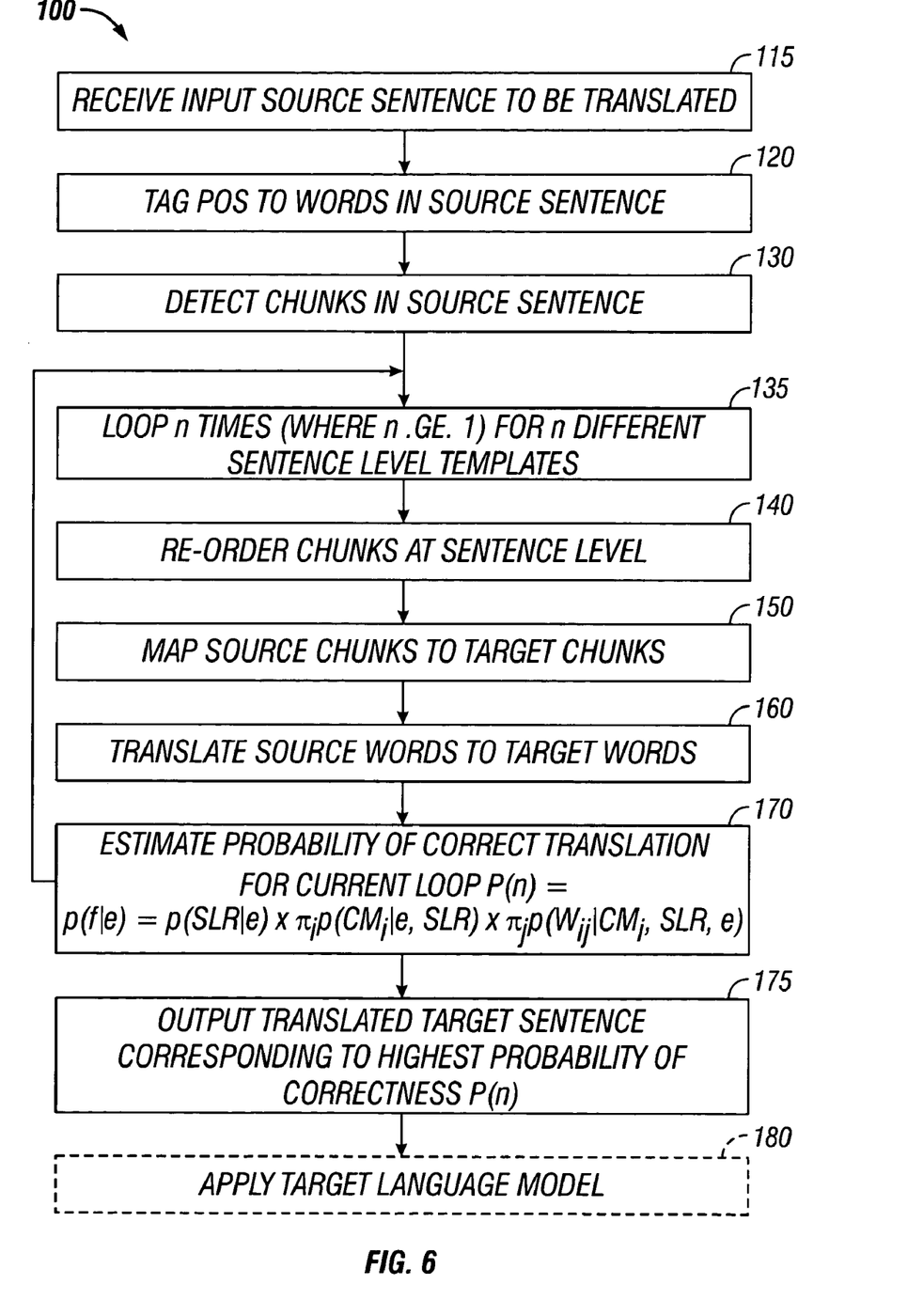
FIG. 6 shows a second embodiment of a LST process.

FIG. 6 shows an embodiment of an LST process 100 that is modeled upon the equations and formulations discussed previously. In this example, LST process 100 includes a loop (135, 140, 150, 160 and 170) that is repeated n times for n different sentence level templates.

A number of embodiments have been described. Nevertheless, it will be understood that various modifications may be made without departing from the spirit and scope of the invention. For example, chunk mapping errors may be caused by source words that translate into multiple target words. This type of error may be avoided or reduced by adding fertility features, or further preprocessing of compound nouns. As another example, word translation may be performed by use of a probabilistic word translation method, e.g., a "T-Table" translation method. As another example, there may be not sufficient statistics to reliably estimate sentence level templates (SLT). Therefore, other estimations may be used, for example, clause level templates, or using a method that decomposes the sentence level chunk translation step into a number of chunk segmentation and translation decisions.

Accordingly, other embodiments are within the scope of the following claims.

The invention claimed is:

1. A computer implemented method, the method comprising:
 assigning a part of speech identifier to each word in a source string, the source string in a first language;
 detecting a first sequence of syntactic chunks in the source string, the syntactic chunks each comprising at least one of the words;
 assigning a syntactic chunk label to each of the detected syntactic chunks in the source string;
 defining connections between each of the detected syntactic chunks in the source string and at least one syntactic chunk of a sequence of syntactic chunks in a target string, the target string being a parallel translation in a second language of the source string, said defining comprising determining connections based on a chunk mapping table, the chunk mapping table using pre-defined connections based on the assigned syntactic chunk label;
 mapping each word in the detected syntactic chunks in the source string to each word in the syntactic chunks in the target string, said mapping based on a word mapping table and the part of speech identifier;
 translating by a computer an input string in the first language into a translation in the second language based on the chunk mapping table and the word mapping table, and
 outputting the translation using the computer.

2. The method of claim 1, wherein assigning the syntactic chunk label comprises assigning based on the assigned part of speech identifier of the at least one of the words in the source string.

3. The method of claim 1, wherein defining connections comprises defining a connection between the detected chunk from the source string to at least two non-adjacent chunks in the target string.

4. The method of claim 1, wherein defining connections comprises defining a connection of at least two detected chunks from the source string to a single chunk in the target string.

5. The method of claim 1, wherein translating comprises including at least two words in the target string that corresponds to a single word in the source string.

6. The method of claim 1, wherein translating comprises translating phrases.

7. The method of claim 1, further comprising:
 applying a language model to the source string, the language model based upon the language of the target string.

8. The method of claim 1, further comprising:
 determining a probability of said mapping.

9. The method of claim 1, wherein translating comprises inserting at least one NULL word in the target string.

10. A computer readable storage medium having stored thereon a program, the program being executable by a processor for performing a method, the method comprising:

assigning a part of speech identifier to each word in a source string, the source string in a first language;

detecting a first sequence of syntactic chunks in the source string, the syntactic chunks each comprising at least one of the words;

assigning a syntactic chunk label to each of the detected syntactic chunks in the source string;

defining connections between each of the detected syntactic chunks in the source string and at least one syntactic chunk of a sequence of syntactic chunks in a target string, the target string being a parallel translation in a second language of the source string, said defining comprising determining connections based on a chunk mapping table, the chunk mapping table using pre-defined connections based on the assigned syntactic chunk label;

mapping each word in the detected syntactic chunks in the source string to each word in the syntactic chunks in the target string, said mapping based on a word mapping table and the part of speech identifier; and translating by a computer an input string in the first language into a translation in the second language based on the chunk mapping table and the word mapping table.

11. The computer readable medium of claim 10, wherein assigning the syntactic chunk label further comprises assigning the syntactic chunk label based on the assigned part of speech identifier of the at least one of the words in the source string.

12. The computer readable medium of claim 10, wherein defining connections comprises defining a connection between the detected chunk from the source string to at least two non-adjacent chunks in the target string.

13. The computer readable medium of claim 10, wherein defining connections comprises defining a connection of at least two detected chunks from the source string to a single chunk in the target string.

14. The computer readable medium of claim 10, wherein translating comprises including at least two words in the target string that corresponds to a single word in the source string.

15. The computer readable medium of claim 10, wherein translating comprises causing a machine to translate phrases.

16. The computer readable medium of claim 10, wherein the method further comprises:

applying a language model to the source string, the language model based upon the language of the target string.

17. The computer readable medium of claim 10, wherein the method further comprises:

determining a probability of said mapping.

18. The computer readable medium of claim 10, wherein translating comprises causing a machine to insert at least one NULL word in the target string.

* * * * *

UNITED STATES PATENT AND TRADEMARK OFFICE
CERTIFICATE OF CORRECTION

PATENT NO.       : 7,624,005 B2
APPLICATION NO. : 10/403862
DATED            : November 24, 2009
INVENTOR(S)      : Koehn et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1216 days.

Signed and Sealed this

Twenty-sixth Day of October, 2010

David J. Kappos
*Director of the United States Patent and Trademark Office*